(12) United States Patent
Kaufmann

(10) Patent No.: US 10,479,622 B1
(45) Date of Patent: Nov. 19, 2019

(54) STACKER-RECLAIMER APPARATUS

(71) Applicant: FMW FÖRDERANLAGEN GMBH, Kirchstetten (AT)

(72) Inventor: Mario Kaufmann, St. Pölten (AT)

(73) Assignee: FMW FÖRDERANLANGEN GMBH, Kirchstetten (AT)

( * ) Notice: Subject to any disclaimer, the term of this patent is extended or adjusted under 35 U.S.C. 154(b) by 0 days.

(21) Appl. No.: 16/100,898

(22) Filed: Aug. 10, 2018

(51) Int. Cl.
*B65G 65/06* (2006.01)
*B65G 65/28* (2006.01)

(52) U.S. Cl.
CPC ............. *B65G 65/06* (2013.01); *B65G 65/28* (2013.01)

(58) Field of Classification Search
CPC ......... B65G 65/28; B65G 65/06; B65G 65/22
USPC .................................................. 198/506–522
See application file for complete search history.

(56) References Cited

U.S. PATENT DOCUMENTS

| | | | | |
|---|---|---|---|---|
| 3,370,688 A * | 2/1968 | Westerbrink | ........... | B65G 65/20 198/506 |
| 4,312,441 A * | 1/1982 | Frisk | ....... | B65G 65/28 198/519 |
| 4,336,876 A * | 6/1982 | Cox | ....... | B65G 65/20 198/509 |
| 4,369,877 A * | 1/1983 | Heuer | ........ | B65G 65/06 198/509 |
| 5,232,326 A * | 8/1993 | Golz | ....... | B65G 65/06 198/519 |
| 5,310,121 A * | 5/1994 | Nilson | ...... | B02C 18/28 241/235 |
| 7,101,140 B2 * | 9/2006 | Jonkka | ...... | B65G 3/02 198/519 |
| 8,167,115 B2 * | 5/2012 | Saari | ...... | B65G 65/28 198/600 |
| 8,177,053 B2 | 5/2012 | Hood et al. | | |
| 9,533,840 B1 | 1/2017 | Zeilinger | | |
| 2011/0079492 A1 * | 4/2011 | Kokko | ..... | B65G 65/28 198/510.1 |
| 2014/0166442 A1 * | 6/2014 | Toivo | ....... | B65G 65/10 198/614 |

* cited by examiner

*Primary Examiner* — William R Harp
(74) *Attorney, Agent, or Firm* — McCoy Russell LLP

(57) ABSTRACT

A stacker-reclaimer apparatus for handling bulk material at a storage site comprising
a central tower having a vertical axis;
an infeed conveyer;
a stacker boom rotatably mounted to the central tower about the vertical axis, the stacker boom receiving the bulk material from the infeed conveyer;
a reclaimer boom rotatably mounted to the central tower about the vertical axis;
first and second conveyer screws mounted on the reclaimer boom, the first and second conveyer screws extending along first and second longitudinal sides of the reclaimer boom, respectively;
a first harrow extending upwardly and angularly away from the first longitudinal side of the reclaimer boom;
a second harrow extending upwardly and angularly away from the second longitudinal side of the reclaimer boom;
a reclaim hopper, the reclaim hopper receiving bulk material from the reclaimer boom; and
an outfeed conveyer, the outfeed conveyer receiving bulk material from the reclaim hopper.

12 Claims, 5 Drawing Sheets

STACKER-RECLAIMER APPARATUS

FIELD OF THE PRESENT DISCLOSURE

The present disclosure relates generally to stacker-reclaimer apparatus for handling bulk material at a storage site.

The present disclosure further relates to a method for handling bulk material at a storage site.

DESCRIPTION OF THE RELATED ART

Such stacker-reclaimer apparatus, as is well known in the prior art, stacks and reclaims bulk material, such as wood chips, from a pile of bulk material at a storage site. A known design of stacker-reclaimer devices has a central tower to which a stacker boom and a reclaimer boom are mounted. The stacker boom deposits bulk material on the pile. The reclaimer boom reclaims the bulk material. For this purpose, a conveyor mounted on the reclaimer boom conveys the reclaimed material inwards towards the center of the storage site. From there, the reclaimed bulk material is discharged into an outfeed conveyer. In operation, the stacker boom and the reclaimer boom rotate about the vertical axis of the central tower.

One example for such stacker reclaimer apparatus is disclosed in U.S. Pat. No. 8,177,053. For reclaiming bulk material, a single harrow extends upwardly and angularly away from a reclaimer boom in contact with the face of the pile of bulk material, thereby enabling pushing or raking of material into a transfer chute in a pit below the central tower. The reclaimed material is then passed to an enclosed tubular air cushion conveyor outfeed. In this prior art, the conveyor outfeed is arranged below ground so that the reclaimer boom may sweep over the outfeed conveyer. Thus, the reclaimer boom is operated in but one direction of rotation.

On the other hand, sector stacker-reclaimer apparatus with above ground outfeed conveyers are known in the prior art. One example is shown in U.S. Pat. No. 9,533,840. In this prior art, the region around the above ground outfeed conveyer is kept free of bulk material. For reclaiming bulk material, this prior art apparatus uses an innovative technique in which the reclaimer boom is hoisted simultaneously with rotating the reclaimer boom about the vertical axis of the central tower. In this way, the reclaimer boom is moved over a lateral slope of the pile at the storage site, thus reclaiming bulk material therefrom. While this prior art entails many advantages, in some cases it is preferred that a more conventional design of the reclaimer boom can be used in a sector stacker-reclaimer apparatus.

It is thus an object of the present disclosure to alleviate at least some of the drawbacks associated with the prior art stacker-reclaimer apparatus.

SUMMARY OF THE PRESENT DISCLOSURE

In an embodiment, a stacker-reclaimer apparatus for handling bulk material at a storage site comprises:

a central tower having a vertical axis;

an infeed conveyer;

a stacker boom rotatably mounted to the central tower about the vertical axis, the stacker boom receiving the bulk material from the infeed conveyer;

a reclaimer boom rotatably mounted to the central tower about the vertical axis;

a first conveyer screw mounted on the reclaimer boom, the first conveyer screw extending along a first longitudinal side of the reclaimer boom;

a second conveyer screw mounted on the reclaimer boom, the second conveyer screw extending along a second longitudinal side of the reclaimer boom;

a first harrow extending upwardly and angularly away from the first longitudinal side of the reclaimer boom;

a second harrow extending upwardly and angularly away from the second longitudinal side of the reclaimer boom;

a reclaim hopper, the reclaim hopper receiving bulk material from the reclaimer boom; and an outfeed conveyer, the outfeed conveyer receiving bulk material from the reclaim hopper.

In this embodiment, the reclaimer boom is arranged for operating in both a first direction of rotation and a second, reversed direction of rotation. For this purpose, the first and second longitudinal sides of the reclaimer boom carry the first and second harrow, respectively. When the reclaimer boom rotates in the first direction of rotation, the first harrow pushes and rakes bulk material from a slope of the pile at the storage site into the first conveyer screw. The first conveyer screw transports the reclaimed bulk material radially inwards towards the central tower of the storage site for feeding out from the storage site. In the same fashion, when the reclaimer boom rotates in the second direction, the second harrow pushes and rakes bulk material from another slope of the pile into the second conveyer screw which conveys the reclaimed bulk material radially inwards towards the center of the storage site. This construction is particularly favorable when deployed in a sector stacker reclaimer as the reclaimer boom may operate in both directions of rotation. On the other hand, the construction of the reclaimer boom is very simple and reliable. Little maintenance is required.

In an embodiment, the reclaimer boom has a guide for guiding first and second harrow between an inner position and an outer position along the reclaimer boom, respectively. Thus, the first and second harrow travels along the reclaimer boom when the reclaimer boom rotates in the first or second direction of rotation.

For the purpose of this disclosure, all positions and directions, such as "inwards", "outwards", "radially", "upper", "lower" etc., are given with respect to the vertical axis of the central tower of the stacker-reclaimer apparatus as installed at the storage site.

The embodiments described above are favorably applied to a type of stacker reclaimer called sector stacker-reclaimer, in which a section of the storage site, where the outfeed conveyer is located, is kept free of bulk material.

In an embodiment, a vertical extension of the outfeed conveyer overlaps with a vertical extension of the reclaimer boom. In this embodiment, the outfeed conveyer is arranged at such vertical position (height) that the reclaimer boom cannot be turned above the outfeed conveyer. By reversing the direction of rotation, the reclaimer boom may operate in two directions and thus need not be swept over the outfeed conveyer.

In an embodiment, the outfeed conveyer is arranged above ground. Thus, it is not required to provide for an underground outfeed conveyer, i.e. an outfeed conveyer extending below a storage surface extending at the storage site for placing the bulk material thereon.

Another embodiment comprises an intermediate conveyer, the intermediate conveyer receiving bulk material from the first and second conveyer screw and conveying bulk material to the reclaim hopper.

In an embodiment, the intermediate conveyer comprises at least one conveyer screw. This embodiment is particularly low maintenance.

In an embodiment, the intermediate conveyer extends upwardly and angularly away from inner ends of the first and second conveyer screw on the reclaimer boom. Thus, reclaimed bulk material from the first and second conveyer screw is passed to the intermediate conveyer which transports the reclaimed material to the reclaim hopper at the center of the storage site. The intermediate conveyer is inclined to the vertical axis of the central tower so that the reclaimed material travels upwards and inwards through the intermediate conveyer.

In an embodiment, the intermediate conveyer extends upwards beyond an upper side of the reclaim hopper, the intermediate conveyer releasing bulk material into the reclaim hopper. At the upper end of the intermediate conveyer, reclaimed bulk material may be dropped into the reclaim hopper which may be symmetrically arranged about the vertical axis of the central tower.

In an embodiment, inner ends of first and second screw conveyer and a lower end of the at least one conveyer screw of the intermediate conveyer are arranged inside a common housing. This construction facilitates the passing of bulk material from the first and second conveyer screw to the intermediate conveyer.

The first and second conveyer screw at the first and second longitudinal side of the reclaimer boom may extend over the greater portion of the longitudinal extension of the reclaimer boom, in particular over essentially the entire length of the reclaimer boom. The intermediate conveyer adjoins the first and second conveyer screw at inner ends thereof.

In an embodiment, the first and second conveyer screw extend downwardly at a first angle from an inner end towards an outer end, respectively, while the intermediate conveyer extends downwardly at a second angle from an inner (upper) end towards an outer (lower) end, the second angle of the intermediate conveyer being greater than the first angle of the first and second conveyer screw. Thus, the reclaimer boom may be arranged rather flat, while the intermediate conveyer is arranged steep in comparison. This ensures efficient reclaiming of bulk material on the one hand and disposal of the reclaimed bulk material into the reclaim hopper on the other hand.

Another embodiment comprises a metering screw for conveying bulk material from the reclaim hopper to the outfeed conveyer.

In an embodiment, a method of reclaiming bulk material from a pile at a storage site at least comprises the steps of:
i. turning a reclaimer boom about a vertical axis of a central tower by a first angle in a first direction of rotation, optionally at the same time with
ii. moving a first harrow extending upwardly and angularly away from a first longitudinal side of the reclaimer boom along the reclaimer boom, optionally at the same time with
iii. conveying bulk material along the reclaimer boom by means of a first conveyer screw extending at a first longitudinal side of the reclaimer boom,
iv. turning the reclaimer boom about the vertical axis of the central tower by a second angle in a second direction of rotation, optionally at the same time with
v. moving a second harrow extending upwardly and angularly away from a second longitudinal side of the reclaimer boom along the reclaimer boom, optionally at the same time with vi. conveying bulk material along the reclaimer boom by means of a second conveyer screw at a second longitudinal side of the reclaimer boom,
vii. feeding out bulk material received from the reclaimer boom.

In an embodiment, the first angle and the second angle are less than 360°, respectively. In an embodiment, the first angle and the second angle are less than 300°, respectively. The stacking and reclaiming operation may extend over at least 260°, for example over at least 270°, of a circular storage site when seen in top view.

BRIEF DESCRIPTION OF THE DRAWINGS

Other objects and features of the present disclosure will become apparent from the following detailed description considered in connection with the accompanying drawings. It is to be understood, however, that the drawings are designed as an illustration only and not as a definition of the limits of the present disclosure.

FIGS. 1 to 6 are shown approximately to scale.

DETAILED DESCRIPTION OF THE DRAWINGS

Figure 1:
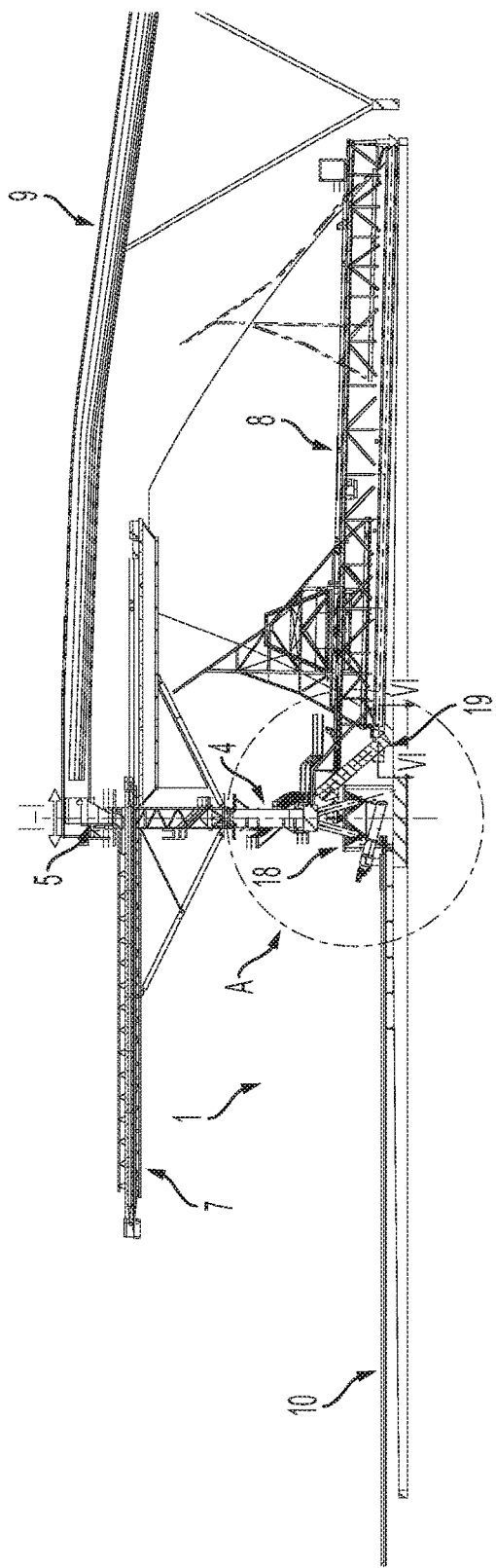
FIG. 1 is a sectional view along lines I-I in FIG. 2 of an embodiment of a stacker-reclaimer apparatus.
Figure 2:
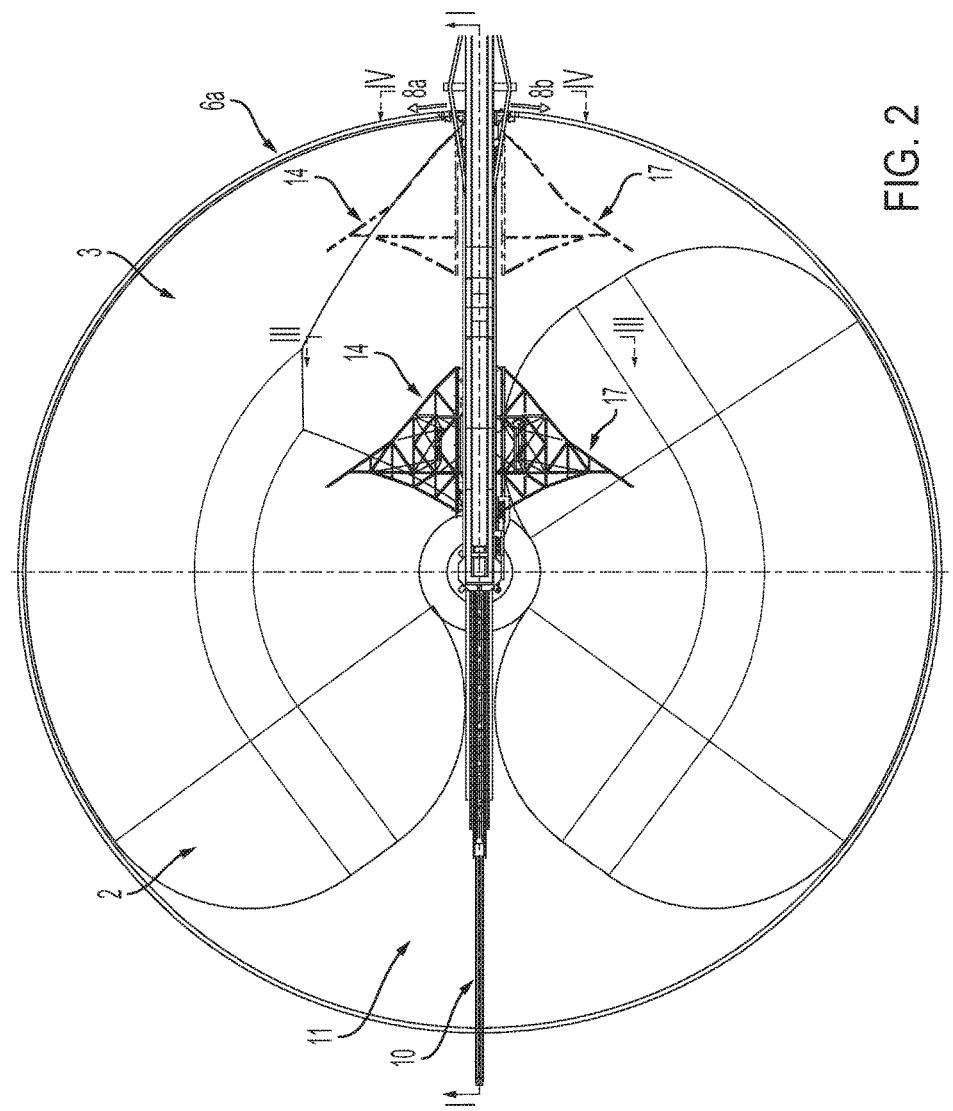
FIG. 2 is a top view of the stacker-reclaimer apparatus of FIG. 1.
Figure 4:
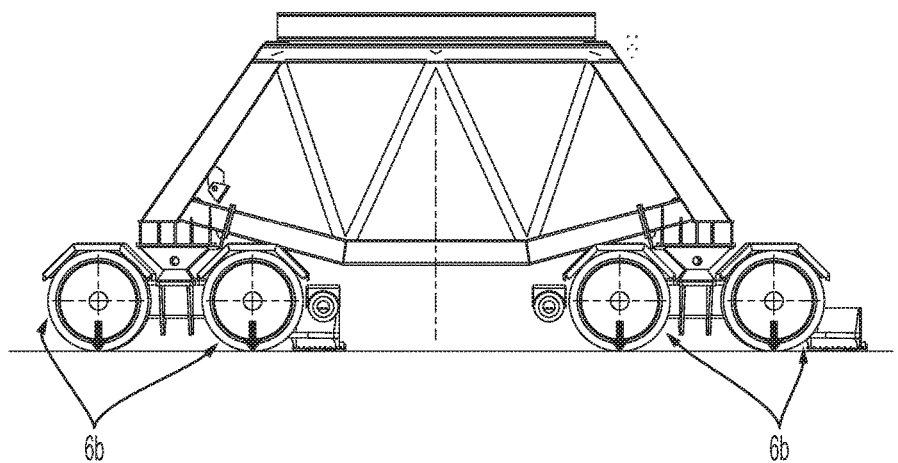
FIG. 4 is a sectional view of the stacker-reclaimer apparatus along lines IV-IV in FIG. 2.

FIGS. 1 and 2 show a stacker-reclaimer apparatus 1 for handling a pile of bulk material 2 at a substantially circular storage site 3. Stacker-reclaimer apparatus 1 comprises a central tower 4 having a vertical axis 5. In the shown embodiment, central tower 4 is arranged at the center of circular storage site 3. A stacker boom 7 is cantilevering from central tower 4 and turns about vertical axis 5 of central tower. Stacker boom 7 may have a conveyor of any conventional construction for conveying bulk material 2 in the longitudinal direction of stacker boom 7. For example, stacker boom 7 may have a belt conveyor. Stacker-reclaimer apparatus 1 further comprises a reclaimer boom 8 for reclaiming bulk material 2 from the pile at the storage site 3. Reclaimer boom 8 projects from central tower 4 and turns about vertical axis 5 of central tower 4 independently of stacker boom 7. An outer end of reclaimer 8 has rolls 6b for rolling support on a circular ring 6a arranged on the ground and delimiting storage site 3 (see FIG. 2 and FIG. 4). Stacker-Reclaimer apparatus 1 further comprises an infeed conveyor 9 extending radially inwards from the periphery of storage site 3 to the center of storage site 3. An inner end of infeed conveyor 9 is supported on an upper end of central tower 4. Infeed conveyor 9 may include any known type of conveyor for conveying bulk material 2 to stacker boom 7, for example a belt conveyor.

Stacker-Reclaimer apparatus 1 further comprises an outfeed conveyor 10 for feeding out bulk material collected with reclaimer boom 8. To this effect, outfeed conveyor 10 transports reclaimed bulk material radially outwards from the center of storage site 3. Outfeed conveyor 10 may be of any known construction, for example including a belt conveyor. In the shown embodiment, outfeed conveyor 10 is arranged above ground. Apparatus 1 thus constitutes a sector stacker-reclaimer, which means that the pile of bulk material 2 extends over less than 360° in top-view. In this way, a sector 11 of circular storage site 3, in which outfeed conveyor 10 is located, is kept free of bulk material 2.

Figure 3:
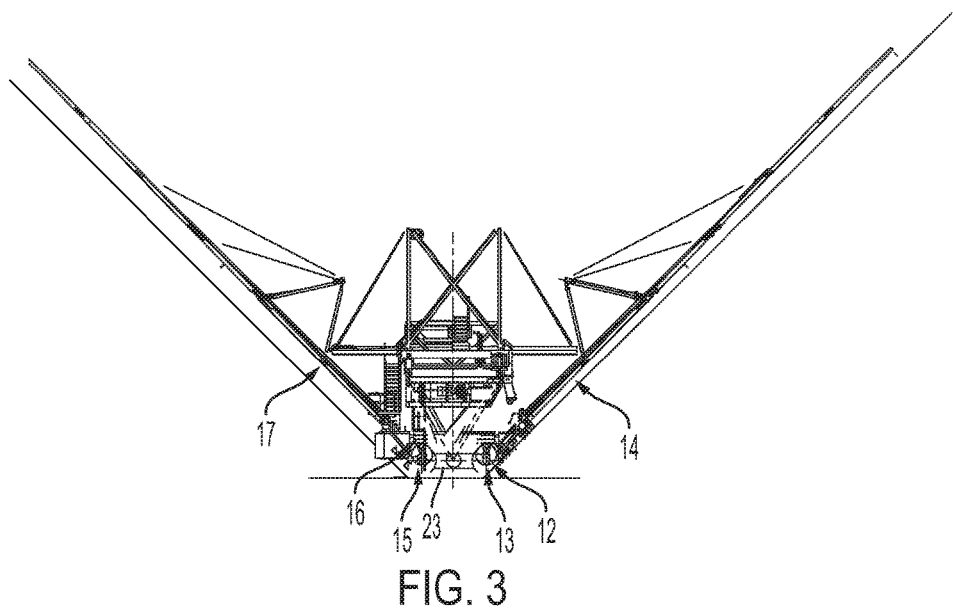
FIG. 3 is a sectional view of the stacker-reclaimer apparatus along lines in FIG. 2.

Stacker-reclaimer apparatus 1 further comprises a first conveyer screw 12 mounted on reclaimer boom 8 (see FIG. 3). First conveyer screw 12 extends along a first longitudinal side 13 of reclaimer boom 8 over essentially the entire length thereof. A first harrow 14 is angled off first longitudinal side 13 of reclaimer boom 8. First harrow 14 can be moved along reclaimer boom 8 between an inner position (illustrated with solid lines in FIG. 2) and an outer position (illustrated with dashed lines in FIG. 2). In operation, reclaimer boom 8 may be turned in a first direction of rotation (see arrow 8a in FIG. 2) to reclaim bulk material from storage site 3. At the same time, first harrow 14 is moved along reclaimer boom 8 in contact with the pile of bulk material at storage site 3. This has the effect that bulk material trickles down into first conveyer screw 12 which conveys the reclaimed bulk material towards the center of stacker-reclaimer apparatus 1.

As reclaimer boom 8 is arranged too low to pass above ground outfeed conveyor 10, the direction of rotation of reclaimer boom 8 must be reversed when reclaimer boom 8 arrives at sector 11 in which outfeed conveyor 10 is located. Then, reclaimer boom 8 is turned in a second direction of rotation (see arrow 8b in FIG. 2).

In the shown embodiment, a second conveyer screw 15 is mounted on reclaimer boom 8 (see FIG. 3). Second conveyer screw 15 extends along a second longitudinal side 16 of reclaimer boom 8 over essentially the entire length thereof. A second harrow 17 is angled off second longitudinal side 16 of reclaimer boom 8. Both first harrow 14 and second harrow 17 lean away from reclaimer boom 8 to engage inclined slopes of the pile at storage site 3. Second harrow 17 becomes effective when reclaimer boom 8 is turned in second direction of rotation, which is opposite to the first direction of rotation. By moving second harrow 17 longitudinally between an inner position (illustrated with solid lines in FIG. 2) and an outer position (illustrated with dashed lines in FIG. 2), bulk material from the pile at storage site 3 trickles down into second conveyer screw 15 which transports the reclaimed bulk material inwards to the center of storage site 3. In some embodiments, a shield 23 is mounted on the reclaimer boom, the shield extending between the first conveyer screw 12 and the second conveyer screw 15.

As shown in FIG. 1, stacker-reclaimer apparatus 1 further comprises a reclaim hopper 18 at the center of storage site 3. Reclaim hopper 18 receives reclaimed bulk material from reclaimer boom 8. For this purpose, an intermediate conveyor 19 is mounted to an inner end of reclaimer boom 8. Intermediate conveyor 19 receives bulk material from both first conveyer screw 12 and second conveyer screw 15 to feed reclaimed bulk material into reclaim hopper 18. In the shown embodiment, intermediate conveyor 19 comprises two conveyer screws 20 extending in parallel (see FIG. 5). Intermediate conveyor 19 extends upwardly and angularly away from inner ends of first conveyer screw 12 and second conveyer screw 15, respectively. An upper end of intermediate conveyor 19 terminates above an upper side of reclaim hopper 18 so that reclaimed bulk material can be dropped from the upper end of intermediate conveyor 19 into reclaim hopper 18.

Figure 5:
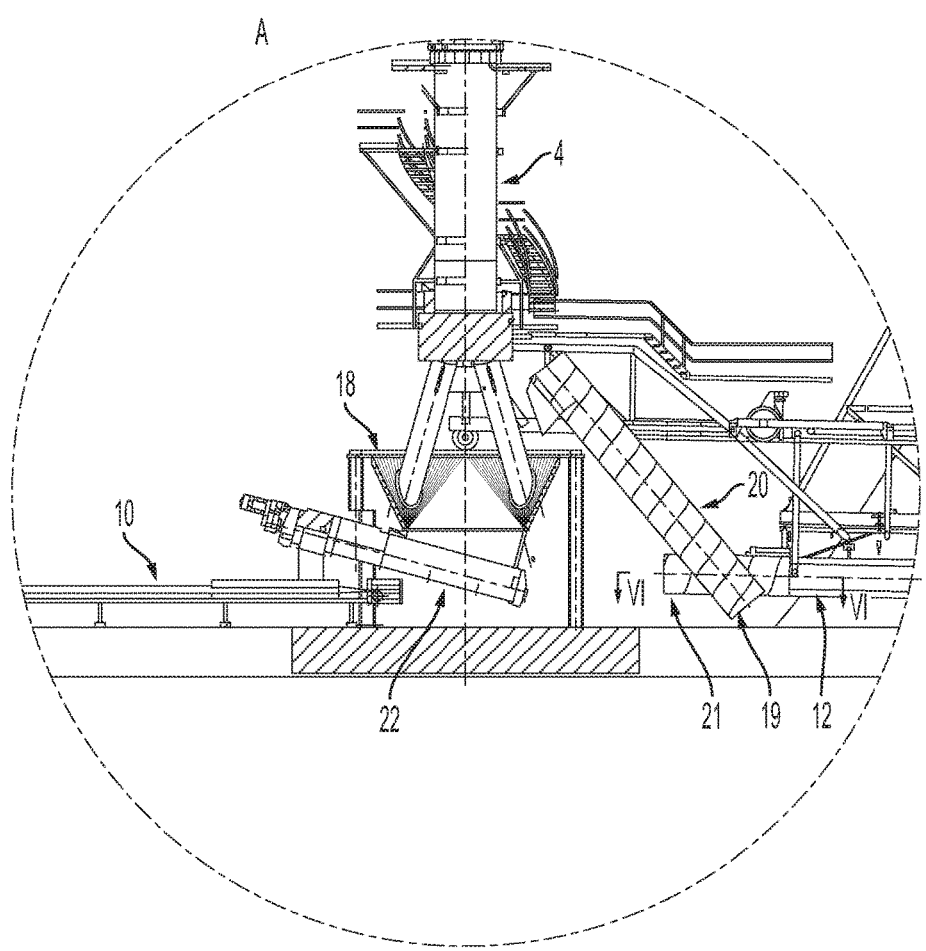
FIG. 5 is detail A shown in FIG. 1.
Figure 6:
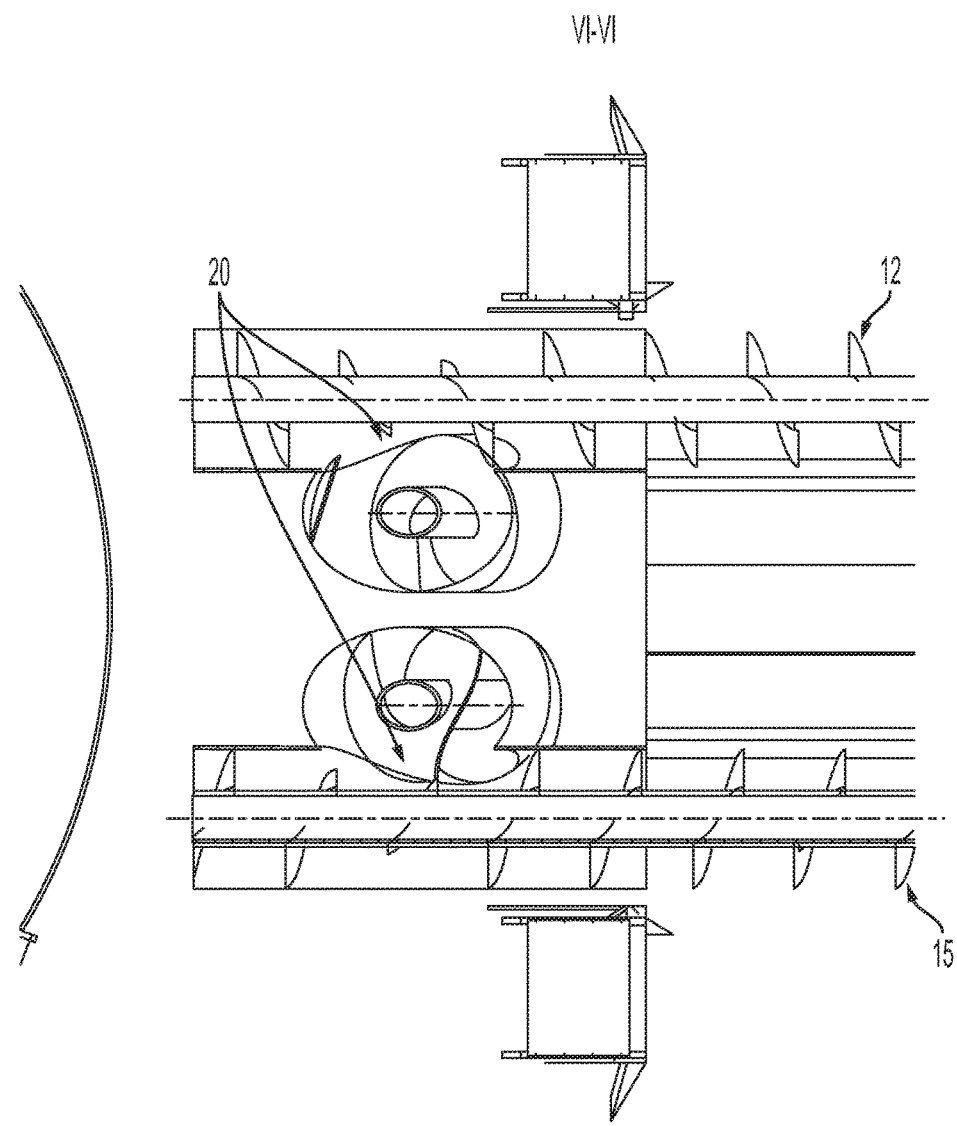
FIG. 6 is a sectional view of the stacker-reclaimer apparatus along lines VI-VI in FIG. 5.

FIGS. 5 and 6 show that inner ends of first screw conveyer 12 and second screw conveyer 15 as well as a lower end of the two conveyer screws 20 of intermediate conveyor 19 are arranged inside a common housing 21 so that reclaimed bulk material is passed from the first and second screw conveyer to intermediate conveyor 19. Bulk material that is dropped into reclaim hopper 18 is received by a metering screw 22 that passes the bulk material to the outfeed conveyor 10. From there, the bulk material is transported radially outwards away from the center of storage site 3.

The invention claimed is:

1. A stacker-reclaimer apparatus for handling bulk material at a storage site comprising:
   a central tower having a vertical axis;
   an infeed conveyor;
   a stacker boom rotatably mounted to the central tower about the vertical axis, the stacker boom receiving the bulk material from the infeed conveyor;
   a reclaimer boom rotatably mounted to the central tower about the vertical axis;
   a first conveyer screw mounted on the reclaimer boom, the first conveyer screw extending along a first longitudinal side of the reclaimer boom;
   a second conveyer screw mounted on the reclaimer boom, the second conveyer screw extending along a second longitudinal side of the reclaimer boom;
   a first harrow extending upwardly and angularly away from the first longitudinal side of the reclaimer boom;
   a second harrow extending upwardly and angularly away from the second longitudinal side of the reclaimer boom;
   a reclaim hopper, the reclaim hopper receiving the bulk material from the reclaimer boom; and
   an outfeed conveyor, the outfeed conveyor receiving the bulk material from the reclaim hopper.

2. The stacker-reclaimer apparatus of claim 1, wherein a vertical extension of the outfeed conveyor overlaps with a vertical extension of the reclaimer boom.

3. The stacker-reclaimer apparatus of claim 1, wherein the outfeed conveyor is arranged above ground.

4. The stacker-reclaimer apparatus of claim 1, further comprising an intermediate conveyor, the intermediate conveyor receiving the bulk material from the first conveyer screw and the second conveyer screws and conveying the bulk material to the reclaim hopper.

5. The stacker-reclaimer apparatus of claim 4, wherein the intermediate conveyor comprises at least one conveyer screw.

6. The stacker-reclaimer apparatus of claim 5, wherein inner ends of the first conveyer screw and the second conveyer screw conveyer and a lower end of the at least one conveyer screw of the intermediate conveyor are arranged inside a common housing.

7. The stacker-reclaimer apparatus of claim 4, wherein the intermediate conveyor extends upwardly and angularly away from inner ends of the first conveyer screw and second conveyer screws on the reclaimer boom.

8. The stacker-reclaimer apparatus of claim 4, wherein the intermediate conveyor extends upwards beyond an upper side of the reclaim hopper, the intermediate conveyor releasing the bulk material into the reclaim hopper.

9. The stacker-reclaimer apparatus of claim 1, further comprising a metering screw for conveying the bulk material from the reclaim hopper to the outfeed conveyor.

10. The stacker-reclaimer apparatus of claim 1, wherein the central tower is static.

11. A method of reclaiming bulk material from a pile at a storage site comprising the steps of:
   turning a reclaimer boom about a vertical axis of a central tower by a first angle in a first direction of rotation, moving a first harrow extending upwardly and angularly away from a first longitudinal side of the reclaimer boom along the reclaimer boom, conveying the bulk material along the reclaimer boom by means of a first conveyer screw extending at the first longitudinal side of the reclaimer boom, turning the reclaimer boom about the vertical axis of the central tower by a second angle in a second direction of rotation, moving a second harrow extending upwardly and angularly away from a second longitudinal side of the reclaimer boom along the reclaimer boom, conveying the bulk material along the reclaimer boom by means of a second conveyer screw at the second longitudinal side of the reclaimer boom, and feeding out the bulk material received from the reclaimer boom.

12. A stacker-reclaimer apparatus for handling bulk material at a storage site comprising:

a central tower having a vertical axis;

an infeed conveyer;

a stacker boom rotatably mounted to the central tower about the vertical axis, the stacker boom receiving the bulk material from the infeed conveyer;

a reclaimer boom rotatably mounted to the central tower about the vertical axis;

a first conveyer screw mounted on the reclaimer boom, the first conveyer screw extending along a first longitudinal side of the reclaimer boom;

a second conveyer screw mounted on the reclaimer boom, the second conveyer screw extending along a second longitudinal side of the reclaimer boom;

a shield mounted on the reclaimer boom, the shield extending between the first conveyer screw and the second conveyer screw;

a first harrow extending upwardly and angularly away from the first longitudinal side of the reclaimer boom;

a second harrow extending upwardly and angularly away from the second longitudinal side of the reclaimer boom;

a reclaim hopper, the reclaim hopper receiving the bulk material from the reclaimer boom; and an outfeed conveyer, the outfeed conveyer receiving the bulk material from the reclaim hopper.

* * * * *